United States Patent Office 3,763,125
Patented Oct. 2, 1973

3,763,125
POLYMERISATION PROCESSES USING IMPROVED FRIEDEL-CRAFTS CATALYSTS
Anthony Gifford Moody and Ian Stanley Ripley, Stockton-on-Tees, England, assignors to Imperial Chemical Industries Limited, London, England
No Drawing. Filed Feb. 7, 1972, Ser. No. 224,313
Claims priority, application Great Britain, Feb. 22, 1971, 5,097/71
Int. Cl. C08f 15/01, 15/02
U.S. Cl. 260—81          9 Claims

ABSTRACT OF THE DISCLOSURE

In a Friedel-Crafts catalysed polymerisation in which, for example, aluminium chloride is used to catalyse the polymerisation of an unsaturated petroleum fraction to produce a petroleum resin, the improved catalyst complex comprises aluminium chloride/hydrogen chloride and a benzene substituted by at least one secondary or tertiary alkyl group, e.g. cumene or p-cymene, or cycloalkyl group.

---

The present invention relates to polymerisation processes in which a Friedel Crafts catalyst is used.

Friedel-Crafts catalysts are known to catalyse the polymerisation of olefinic compounds, particularly dienes such as butadiene, isoprene and piperylene and aralkenes such as styrene and alpha-methylstyrene. Preferred Friedel-Crafts catalysts for this type of polymerisation are inorganic halides, particularly aluminium chloride. The inorganic halide is often used as a complex with a halogen hydracid in a liquid carrier which is commonly toluene. It is our experience that the use of toluene tends to produce very dark polymers and it is an object of this invention to specify a carrier for the Friedel-Crafts complex which helps to produce a polymer of lighter and improved colour.

According to the invention a polymerisation process comprises contacting an olefinic compound or compounds with a Friedel-Crafts catalyst in the presence of a benzene which is liquid at the temperature of the reaction and which is substituted by at least one secondary or tertiary alkyl group or by a cycloalkyl group.

The process of the invention is applicable to any known Friedel-Crafts catalysed polymerisation in which a carrier is required for the catalyst and is particularly applicable to the production of polymers or resins from raw materials comprising mono-olefines, e.g. $C_4$ to $C_{10}$ mono-olefines such as isobutene, conjugated diolefines, e.g. butadiene, isoprene or piperylene, styrene, alpha-methylstyrene or mixtures of coumarone and indene. Mixtures of conjugated and other olefines may be used suitably contained in a "C-5 stream" derived from a steam cracked naphtha by distillation and boiling, for example, in the range $-10°$ to $80°$ C., particularly $+10°$ to $80°$ C. Such a stream may contain cyclopentadiene, isoprene, piperylene and mono-olefines such as cyclopentene, pentene-1 and methyl butenes (see our co-pending application No. 177,113, now U.S. Pat. 3,709,8543). Polymerisation of such a C–5 stream by a Friedel-Crafts catalyst yields a polymer termed a "petroleum resin."

Friedel-Crafts catalysts are Lewis acids and include both inorganic halides and acids such as hydrofluoric and sulphuric acid. Inorganic halides are more generally preferred and include halides of aluminium, iron, tin, boron, zinc, antimony and titanium. An especially preferred Friedel-Crafts catalyst for use in the process of the invention is aluminium chloride.

The secondary or tertiary alkyl group or cycloalkyl group with which the benzene is substituted may contain up to 12 carbon atoms, but preferably contains up to 6 carbon atoms. Other substituents, particularly alkyl groups, e.g. containing 1 to 10, preferably 1 to 5 carbon atoms, may also be present in the benzene ring and if present it is preferred that one such substituent should be located in the para-position to the secondary or tertiary alkyl group or cycloalkyl group. Preferred benzenes include cumene, tert.-butyl benzene, p-cymene, p-isobutyl toluene and p-ethyl tert.amyl benzene.

The preferred Friedel-Crafts catalysts, i.e. the inorganic halides, are generally used in the process in the form of preformed complexes with the substituted benzene and a hydrogen halide. Thus, an inorganic halide suspended in the substituted benzene is contacted with anhydrous hydrogen halide at ambient temperature, complex formation takes place and the complex separates as an oil from an excess of the substituted benzene. For example, aluminum chloride or bromide suspended in the substituted benzene may be contacted with hydrogen chloride or hydrogen bromide respectively until no further uptake of the hydrogen halide occurs. The catalytic complex may then be separated and used in the polymerisation reaction. It is preferred that the ratio of substituted benzene to aluminium halide in the complex lies in the range 2.5:1 to 10:1.

The process of the invention may be carried out in the absence of an added solvent if, as in the case of the production of petroleum resins there are sufficient unreacted hydrocarbons present to maintain the polymer product in solution. With other monomers, e.g. alpha-methylstyrene an inert solvent or diluent may be used. Suitable solvents include paraffins and cycloparaffins containing 5 to 15 carbon atoms such as hexane and cyclohexane and aromatics such as benzene, toluene, xylenes or an excess of the substituted benzene used as the catalyst component.

The process of the invention is preferably carried out at a temperature in the range $-100°$ C. to $+200°$ C., preferably $-100°$ to $+100°$ C. under atmospheric pressure. The catalyst concentration is preferably in the range 0.5 to 5 wt. percent (based on the Friedel-Crafts catalyst) and the reaction time preferably 1 to 5 hours.

The invention will now be further described with reference to the following examples.

EXAMPLE 1

In this example a catalyst was prepared and used in the production of a petroleum resin.

Catalyst preparation

Granular anhydrous aluminium chloride (0.8 mole) in cumene or toluene (6.2 moles) was stirred at ambient temperature and anhydrous hydrogen chloride bubbled under the liquid surface until no further absorption occurred (90 minutes). A dark coloured oily complex separated as a lower layer from the excess hydrocarbon.

| Properties | Hydrocarbon used in the complex ||
|---|---|---|
| | Cumene (a) | Toluene (b) |
| Volume of complex formed (mls.) | 400 | 398 |
| Concentration of aluminium chloride in the complex (g./ml.) | 0.293 | 0.303 |
| Molar ratio of HCl absorbed to AlCl$_3$ | 1:1.02 | 1:1.02 |
| Colour | Brown | Greenblack |

Polymerisation

A C–5 stream derived from a steam cracked naphtha comprised cyclopentadiene, isoprene, piperylene, n-pentane, iso-pentane, pentene-1, pentene-2, 2-methyl butene-2, cyclopentene and cyclopentane. This mixture was thermally soaked at 120° C. to dimerise the cyclopentadiene.

The mixture free from cyclopentadiene monomer was placed in a flask provided with cooling facilities and the complex prepared above slowly added over a period of 3 hours, the temperature being maintained at ambient. A further 1 hour was then allowed to complete the polymerisation. The catalyst complex was added so as to provide 1.25% by weight of aluminium chloride based on the hydrocarbon mixture to be polymerised. On completion of the polymerisation the catalyst was neutralised by the adding of aqueous ammoniacal isopropanol and the solid residue filtered off. The remaining solution was stripped of low boiling components by distillation and finally steam distilled at 160° C. to remove heavy oils. Properties of the resin obtained are shown below.

| Properties of resin | Hydrocarbon used in the complex | |
|---|---|---|
| | Cumene (a) | Toluene (b) |
| Polymer yield, percent | 41 | 42 |
| Softening point, °C.[1] | 96 | 97 |
| Colour[2] | 1.4Y+0.6R | 4.3Y+1.2R |

[1] Ball and R method.
[2] 2% solution in toluene in a Lovibond tintometer (2″ cell).

EXAMPLE 2

A catalyst complex was prepared as in Example 1 from aluminium chloride, cumene and hydrogen chloride.

This complex was then added in portions every five minutes over a period of 2 hours to a mixture of 300 grams alpha-methylstyrene and 150 grams toluene maintained at −10° C. to +5° C. The amount of complex added was 0.5% by weight calculated as aluminium chloride. On completion of the addition the catalyst was precipitated with ammoniacal isopropanol and the solution of the polymer in toluene filtered free from the precipitate. The polymer was then precipitated from the toluene solution with methanol and the residue freed from toluene and methanol by heating at 50° C. under 3 mm. mercury pressure for 9 hours.

The yield of resin based on alpha-methylstyrene monomer was 98%. The resin had a softening point of 98° C., a molecular weight of 939 to 960, a nil ash content and was white in colour (100% solution 1 Gardner).

A film made from the resin did not degrade after 12 hours at 120° C. The colour of a bulk sample of the resin deteriorated from 1 to only 3 Gardner after 12 hours heating at 120° C.

EXAMPLE 3

A catalyst was prepared as in Example 1 from aluminium chloride, cumene and hydrogen chloride.

The catalyst was added slowly to a mixture of alpha-methylstyrene (150 grams) in cumene or heptane (150 grams) at a predetermined temperature so as to maintain the temperature at this preset figure ±7°. Samples were withdrawn, their solids content determined and the reaction was terminated when the solids content reached a constant level (approximately 2 hours). On completion of the polymerisation the polymer was isolated by the technique described in Example 2.

The properties of the polymers produced at various temperatures in the two solvents are shown in Table 1.

EXAMPLE 4

A catalyst was prepared as in Example 1 from aluminium chloride, cumene and hydrogen chloride.

The catalyst (1.25% as AlCl$_3$) was slowly added to a 1:1 molar mixture of alpha-methylstyrene and isobutene (150 grams) dissolved in toluene (150 grams) the rate of addition being adjusted so as to control the temperature at −15±5° C. After 2 hours the reaction was terminated and the polymer isolated as in Example 2.

The polymer yield was 98% on total polymerisables and consisted of a viscous oil of molecular weight 552 to 583, bromine number 1.9 and colour 1 Gardner.

EXAMPLE 5

Example 4 was repeated using a 50% solution of isobutene in toluene (150 grams) at a reaction temperature of 0°±5° C.

The polymer yield was 97% on isobutene and it consisted of an oil of molecular weight 200 to 210 and colour 2 Gardner.

EXAMPLE 6

A catalyst was prepared as in Example 1 from aluminium chloride, cumene and hydrogen chloride. Samples of the catalyst were slowly added to various mixtures of alpha-methylstyrene and dicyclopentadiene (150 grams) at 0° C. so as to give a total catalyst concentration equivalent to 1.25% aluminium chloride. The polymerisation period in each case was 2 hours, the reaction product being worked up as in Example 2. The results of the experiments are given in Table 2.

TABLE 2

| Ratio of alpha-methylstyrene to dicyclopentadiene | Yield based on total polymerisable, percent | Softening point of the resin, °C. | Colour (Gardner) |
|---|---|---|---|
| 1:1 | 66 | 121 | 12 |
| 2:1 | 68 | 108 | 11 |
| 3:1 | 78 | 110 | 11 |
| 9:1 | 84 | 104 | 6 |

EXAMPLE 7

A catalyst prepared from aluminium chloride, cumene and hydrogen chloride as in Example 1 was used to polymerise a C-9 carbon atom fraction derived by distillation from a petroleum feedstock. The fraction contained approximately 30% by weight of polymerisable material comprising styrene, alpha-methylstyrene, vinyl toluenes, indene, dicyclopentadiene together with benzene, toluene and xylenes. The polymerisation was carried out as described in previous examples over a period of two hours at a temperature of 25 to 35° C. and at a catalyst concentration equivalent to 1% by weight aluminium chloride based on total weight of the C-9 fraction.

The yield of resin of softening point 108° C. was 30% (based on total weight of feed). The colour of the resin was 12 Gardner and it had a bromine number of 25.

EXAMPLE 8

Granular anhydrous aluminium chloride (18 grams) in p-cymene (125 grams) was stirred at ambient temperature and anhydrous hydrogen chloride bubbled under the liquid surface until no further absorption occurred. A dark red oily complex separated as a lower layer from the excess hydrocarbon, the molar ratio of the complex

TABLE 1

| Solvent | Reaction temperature, °C. | Catalyst concentration (percent by wt. AlCl$_3$) | Yield (based on alphamethylstyrene), percent | Softening point, °C. | Molecular weight | Colour, Gardner units |
|---|---|---|---|---|---|---|
| Cumene | 0 | 0.5 | 98 | 80 | 681 | 1 |
| Do | 30 | 0.5 | 98 | 98 | 939 | 1 |
| Do | +20 | 0.5 | 97 | Oil | 300 | 2 |
| Heptane | 0 | 1.5 | 98 | 80 | 680 | 1 |
| Do | −30 | 1.5 | 98 | 98 | 960 | 1 |
| Do | +20 | 1.5 | 96 | Oil | 290 | 2 |

The use of cumene instead of heptane enables one third the amount of catalyst to be used. This advantageous effect is generally obtained when paraffin solvents are replaced by aromatic solvents.

being 1:1:2.5 aluminium chloride:hydrogen chloride:p-cymene.

This catalyst was used to prepare a resin from 100 parts of the C-5 stream described in Example 1, and diisobutene (7.5 parts). The catalyst proved very reactive, 1.25% by weight catalyst (expressed as aluminium chloride) producing a resin of softening point 95° C. in 42% yield (based on polymerisables) after a reaction time of 3 hours.

We claim:

1. In a process for the production of hydrocarbon polymers by polymerization of mixtures of olefins using a catalyst comprising aluminium chloride/hydrogen chloride and an alkyl benzene, the improvement whereby a polymer of lighter color is produced, said improvement comprising polymerizing a mixture of conjugated and other olefins boiling in the range −10° C. to +80° C. at a reaction temperature in the range of −100° C. to +200° C. in the presence of a catalyst comprising aluminium chloride/hydrogen chloride and a benzene which is liquid at the reaction temperature and which is substituted by at least one secondary or tertiary alkyl group or by a cycloalkyl group.

2. The process of claim 1 in which the mixture of conjugated and other olefins comprises a "C-5 stream" derived from a steam cracked naphtha by distillation.

3. The process of claim 1 in which the benzene contains one or more $C_1$ to $C_{10}$ alkyl groups other than the secondary or tertiary alkyl group or cycloalkyl group.

4. The process of claim 1 in which the catalyst is employed as a performed complex of aluminium chloride, with the benzene substituted by a secondary or tertiary alkyl group or cycloalkyl group and hydrogen chloride.

5. The process of claim 1 in which the reaction temperature is in the range of −100° C. to +100° C. and the benzene substituted by a secondary or tertiary alkyl group or cycloalkyl group is selected from the group consisting of cumene or p-cymene.

6. The process of claim 1 wherein the ratio of the substituted benzene to aluminium chloride is in the range of 2.5:1 to 10:1.

7. The process of claim 1 in which the secondary or tertiary alkyl group or cycloalkyl group with which the benzene is substituted contains up to six carbon atoms.

8. The process of claim 7 in which the benzene substituted by a secondary or tertiary alkyl group is selected from the group consisting of cumene, tert.butyl-benzene, p-cymene, p-isobutyl toluene and p-ethyl-tert.-amylbenzene.

9. The process of claim 5 in which the aluminium chloride is first reacted with the hydrogen chloride and the cumene or cymene before being used in the polymerisation.

References Cited

UNITED STATES PATENTS

| | | | |
|---|---|---|---|
| 2,383,084 | 8/1945 | Rummelsburg | 260—81 |
| 1,982,708 | 12/1934 | Thomas et al. | 260—82 |

FOREIGN PATENTS

| | | |
|---|---|---|
| 1,195,760 | 6/1970 | Great Britain. |

OTHER REFERENCES

Karlinskii et al.: Chem. Abs. 66 (1967), pp. 76523f.

HARRY WONG, JR., Primary Examiner

U.S. Cl. X.R.

260—82, 666